O. MEILI & P. BLUMBERG.
FEED CUTTER.
APPLICATION FILED JAN. 29, 1915.

1,255,623.

Patented Feb. 5, 1918.
2 SHEETS—SHEET 1.

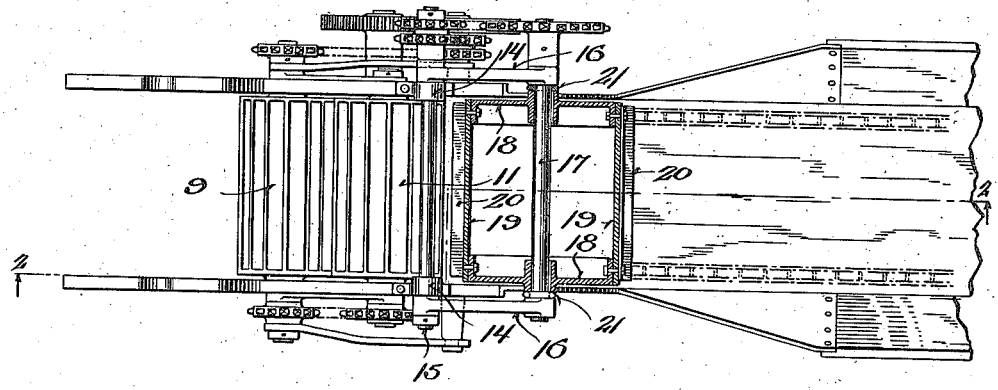
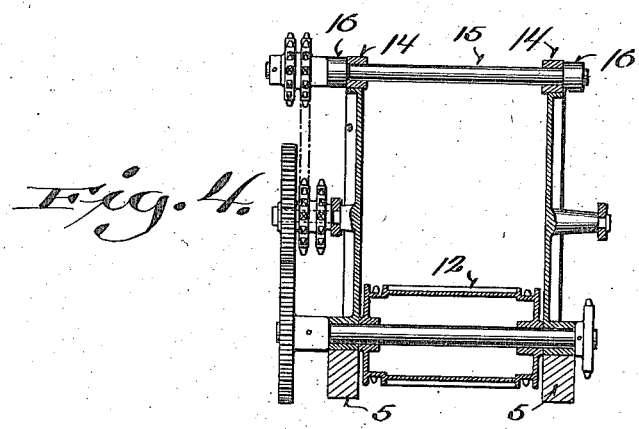

UNITED STATES PATENT OFFICE.

OTTO MEILI AND PAUL BLUMBERG, OF NEW HOLSTEIN, WISCONSIN.

FEED-CUTTER.

1,255,623.        Specification of Letters Patent.        Patented Feb. 5, 1918.

Application filed January 29, 1915. Serial No. 5,065.

*To all whom it may concern:*

Be it known that we, OTTO MEILI and PAUL BLUMBERG, both citizens of the United States, and residents of New Holstein, in the county of Calumet and State of Wisconsin, have invented certain new and useful Improvements in Feed-Cutters; and we do hereby declare that the following is a full, clear, and exact description thereof.

Our invention relates to new and useful improvements in feed cutters, and more particularly to the feed mechanism thereof.

One object of this invention is to provide a novel arrangement of the feed rollers to form a V-shaped throat which is variable in size by reason of the permitted vertical movement of certain of the feed rollers; such an arrangement causes the feed to be packed by successive steps until the cutting means is reached.

Another object of the invention is to provide an arrangement of feed rollers which are operated at progressively increasing speeds from the cutting means whereby the forage will be fed to said means in a manner somewhat similar to manual movement thereof.

With these objects in view the invention consists of certain novel features of construction, combination and arrangement of parts which will be hereinafter more particularly described and claimed and shown in the drawings, wherein:

Fig. 3 is a plan view partly in horizontal section of the parts shown in the previously described figures with the exception that the cutter head is removed, and Fig. 4 is a vertical transverse section taken substantially on the plane of the line 4—4 of Fig. 2.

Figure 1:
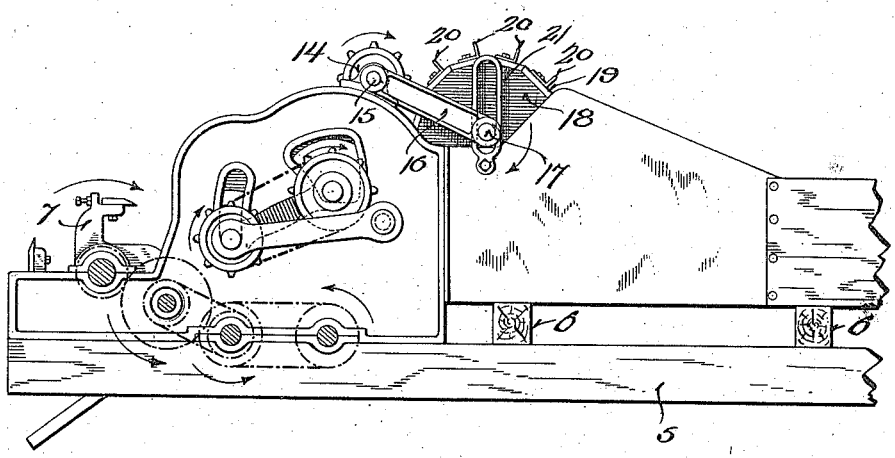
Figure 1 represents a side elevational view of the feed box and operating mechanism of our improved forage cutter.

Referring more particularly to the accompanying drawings it will be noted that the numeral 5 designates each of a pair of parallel sills having cross beams 6 thereon, and on each sill and cross beam is mounted a feed box of our improved forage cutter. The cutter has a cutter head 7 of any ordinary or improved design, the blades of which coöperate with a shear bar 8 spaced in front of the members which feed the forage thereto.

This feeding means comprises upper and lower front feed rollers 9 and 10 respectively, upper and lower rear feed rollers 11 and 12 respectively, a conveying belt 13, and a supplementary feed roller 18. The journals of the lower front and rear feed rollers 10 and 12 respectively are so mounted in the frame of the machine that the rollers are relatively fixed, while the journals of the upper front and rear feed rollers 9 and 11 respectively are rotatably disposed in curvilinear slots formed in the sides of the feed box. These rollers 9 and 11 are independently movable with respect to each other as well as to the lower rollers 10 and 12.

Figure 2:
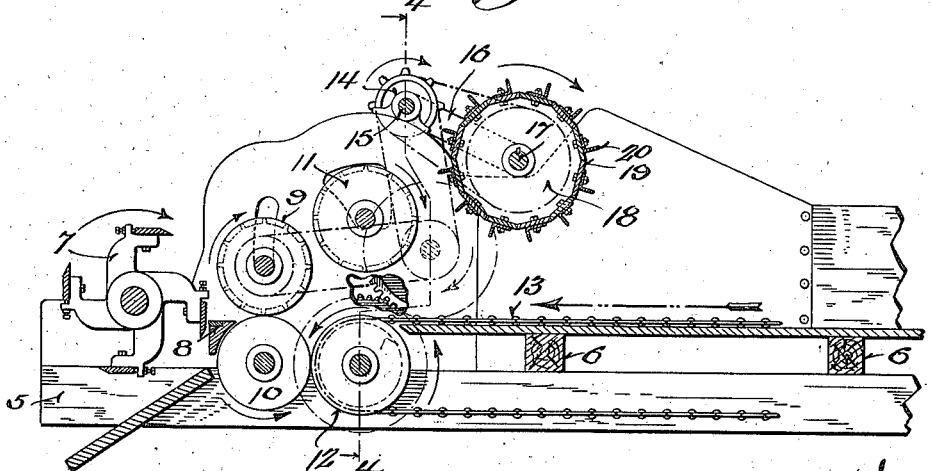
Fig. 2 is a longitudinal sectional view indicated by the line 2—2 of Fig. 3.

From Fig. 2 it will be noted that the uppermost points of the lower feed rollers 10 and 12 are in a horizontal plane substantially co-incident to the plane of the shear bar 8 and also with the upper stretch of the endless conveyer belt 13 which is adapted to run on the lower rear roller 12 as shown.

The sides of the feed box are provided with brackets 14 for the support of the shaft 15 that is fixed therein, said shaft having hangers 16 loosely mounted thereon. The free ends of the hangers are provided with bearings for the reception of the ends of the shaft 17 of said supplementary feed roller 18 which is disposed at the rear of the feed box or back of the upper rear feed roller 11. This supplementary feed roller is preferably formed of flanged polygonal heads to which flat plates 19 are connected, said plates each carrying an angle-bar 20, the bars being outermost and bolted or otherwise secured thereto. The feed roller 18 is therefore of polygonal and substantially corrugated form whereby to accomplish the best results. The shaft 17 of said supplementary feed roller extends through slotted guards 21 which are in pivotal connection with the sides of the feed box as shown in Fig. 1 these guards being adapted to limit vertical movement of the feed roller.

It is hereinbefore noted that the rollers 9 and 11 are independently movable with respect to each other and are also similarly arranged with respect to the supplementary feed roller 18. Although these rollers 9, 11 and 18 are capable of considerable vertical movement upwardly, they are normally disposed in their lowermost position in which position their lowermost portions are in an inclined plane extending upwardly and rearwardly from the point of contact between the rollers 9 and 10. This as will be seen from Fig. 2 provided a substantially V-shaped throat, the lower portion of the V being the plane of the conveyer belt 13 and the uppermost portion, the rollers 10 and 12. In view of the fact that the feed rollers 9, 11 and 18 are movable vertically the size of the throat is variable.

The diameters of the various feed rollers 9, 10, 11, 12 and 18 are such, and the gearing or other driving connections between the same is so arranged that the peripheral speeds of the several rollers are various. More particularly the peripheral speed of the rollers 9, 10 and 12 is the same, this being due to the similarity in diameters and in the method of gearing them to the driving mechanism (not shown). However, the peripheral speed of the roller 11 is greater than that of the roller 9 and similarly the peripheral speed of the supplementary feed roller 18 is greater than that of said roller 11. In other words while the lower feed rollers revolve at uniform peripheral speeds, the peripheral speeds of the upper feed rollers progressively increase from the roller 9 to the roller 18.

The purpose of this arrangement is to simulate manual feeding of forage to the cutting means. That is to say although there is a considerable pile of feed at the rear of the feed box, the bulk of the same is decreased as it is moved toward the cutting means. To accomplish this reduction in bulk it is necessary to move the upper layers of the forage faster than the lower layers which, in the present machine are moved by the conveying belt 13 while at the same time pressing said upper layers downwardly. As the upper layer of the material is compressed its forward movement is lessened as it approaches the rollers 9 and 10 which are directly responsible for supplying the cutting means with the proper amount of the feed.

From the foregoing description it will be obvious that we have invented a simply constructed forage cutter which will have all the advantages of the old manually fed machines without any of their attendant disadvantages, and furthermore the changes in construction and arrangement of parts will greatly increase the capability and efficiency of the present machine already over those of similar construction which are in use.

We claim:—

In a feed cutter having a rotary cutting means, a pair of relatively fixed lower feed rollers disposed rearwardly of the same and upon a common plane, and a conveyer belt carried by the rear lower feed roller, the combination of a series of three upper feed rollers, two of the series being associated with the lower feed rollers and the third roller of the series being positioned rearwardly of the first two rollers thereof and over the conveyer belt, means permitting independent yield of each upper feed roller, means limiting the downward movement of each upper feed roller whereby their working faces normally form a V-shaped feed throat in conjunction with the lower rollers and conveyer belt, and driving means for all of the feed rollers for imparting a progressive increase in the peripheral speed of the upper series of said rollers from the first to the third, and a uniform speed to the first roller of the upper series and the lower set of rollers.

In testimony that we claim the foregoing we have hereunto set our hands at New Holstein in the county of Calumet and State of Wisconsin in the presence of two witnesses.

OTTO MEILI.
P. BLUMBERG.

Witnesses:
FREDERICK BULLWINKEL,
ALMA ARPS.